Feb. 24, 1959 R. J. ALTGELT 2,874,788
TWO WAY PLOW WITH REVERSIBLE MOLDBOARD
Filed Oct. 9, 1952 4 Sheets-Sheet 1
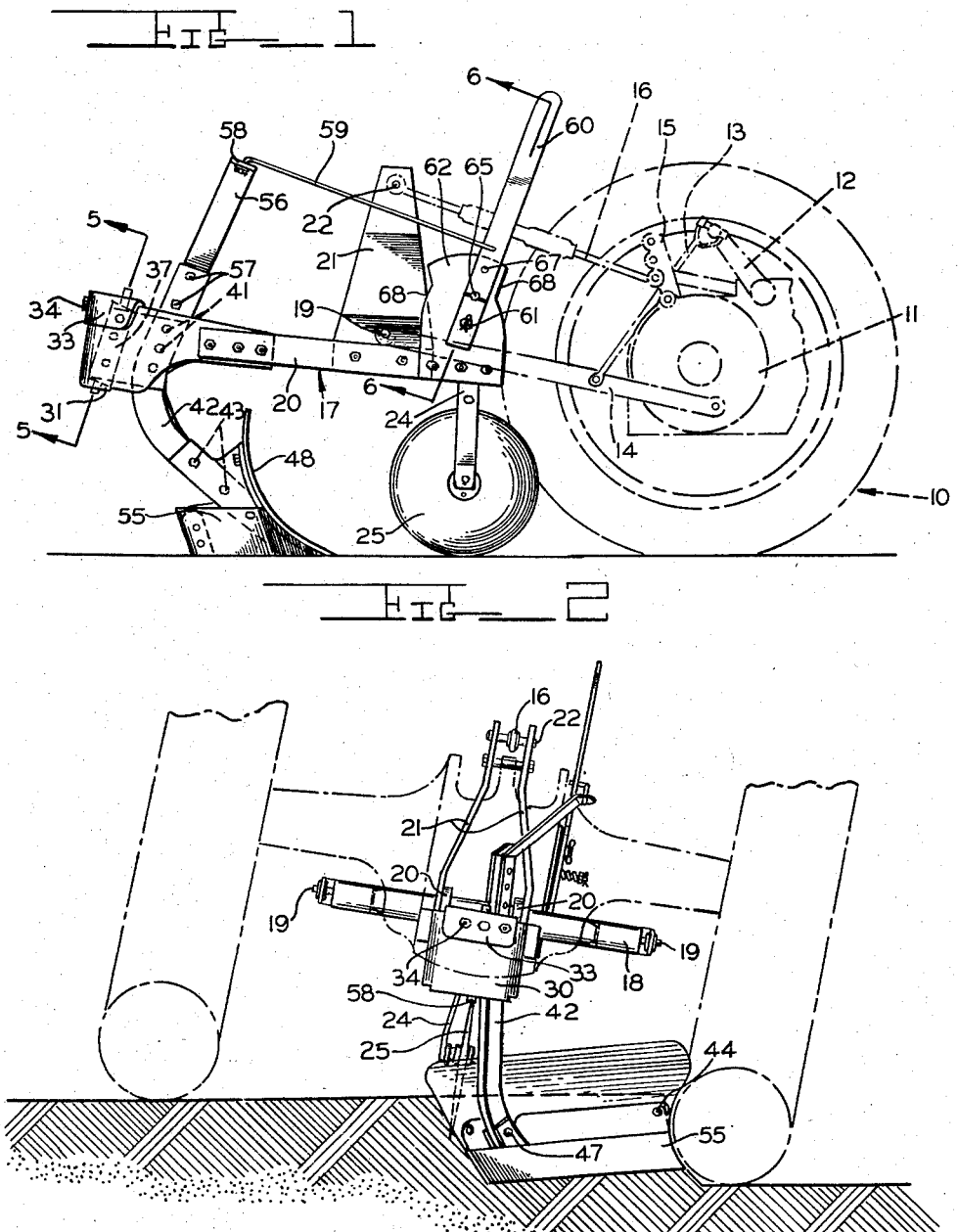
INVENTOR.
RUDOLPH J. ALTGELT
BY
AND
ATTORNEYS Feb. 24, 1959 R. J. ALTGELT 2,874,788
TWO WAY PLOW WITH REVERSIBLE MOLDBOARD
Filed Oct. 9, 1952 4 Sheets-Sheet 2
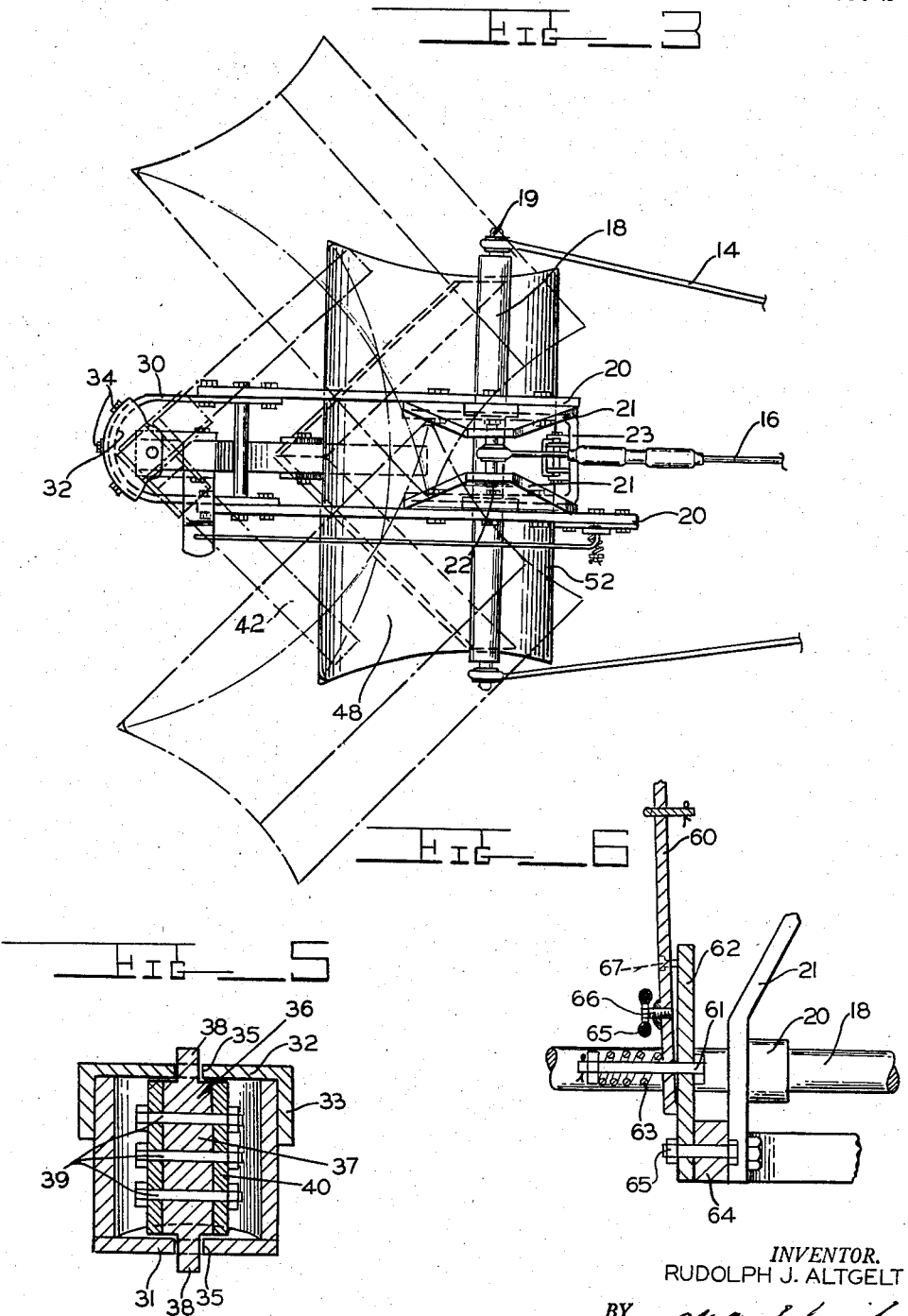
INVENTOR.
RUDOLPH J. ALTGELT
BY
AND
ATTORNEYS Feb. 24, 1959  R. J. ALTGELT  2,874,788
TWO WAY PLOW WITH REVERSIBLE MOLDBOARD
Filed Oct. 9, 1952  4 Sheets-Sheet 3
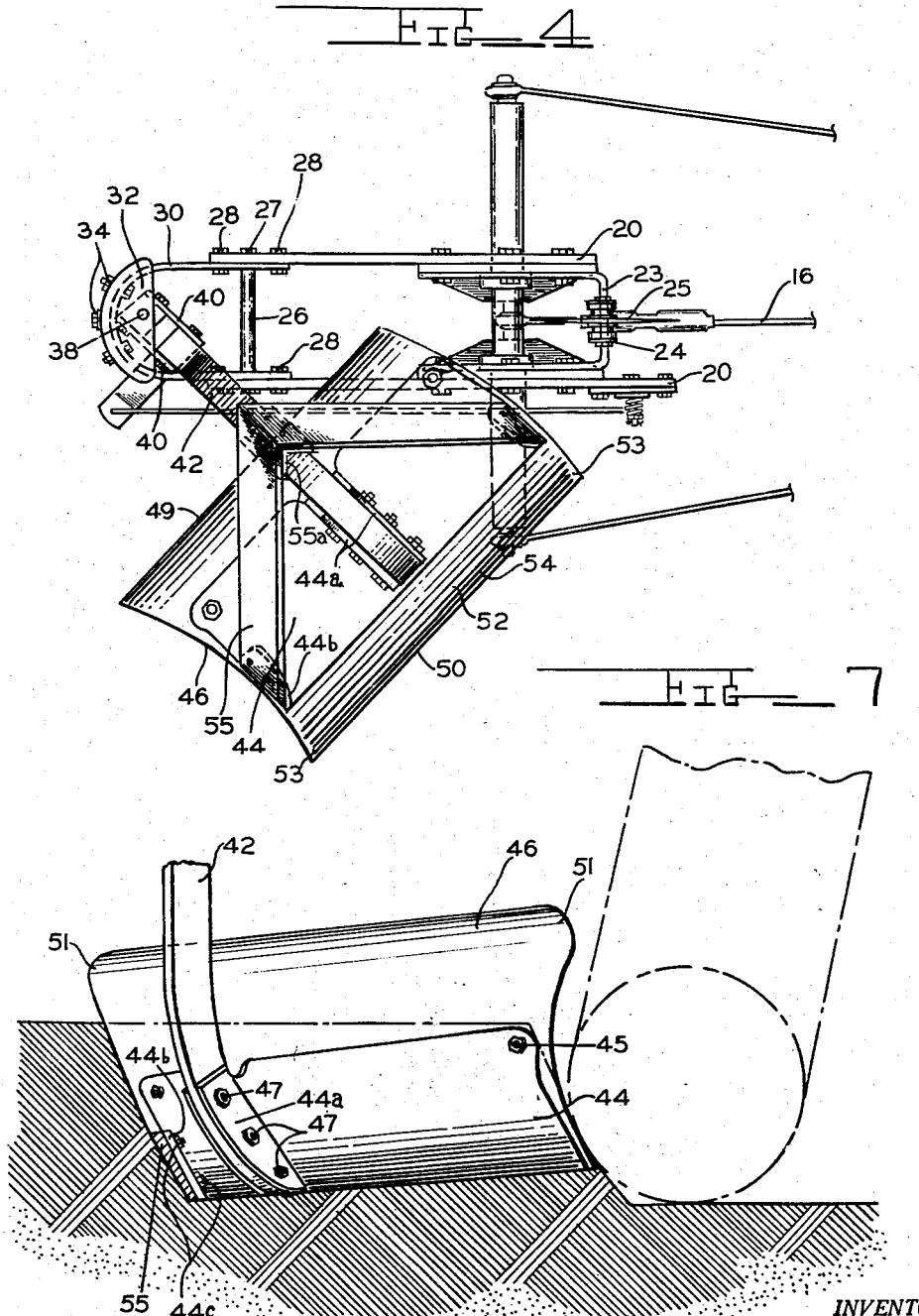
INVENTOR.
RUDOLPH J. ALTGELT
BY
AND
ATTORNEYS

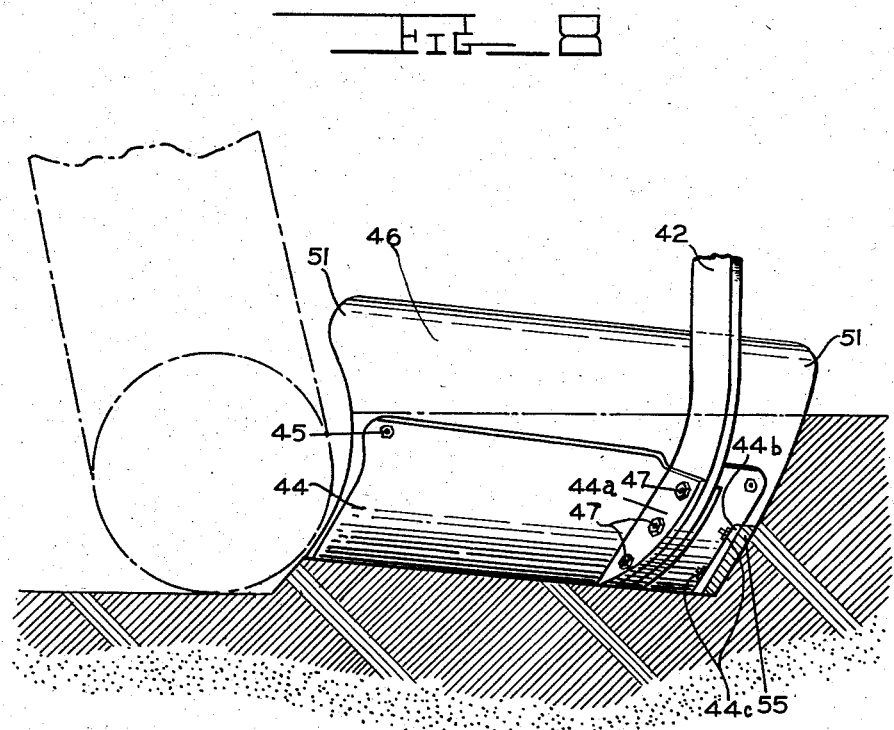

United States Patent Office 2,874,788
Patented Feb. 24, 1959

2,874,788

TWO WAY PLOW WITH REVERSIBLE MOLDBOARD

Rudolph J. Altgelt, South Bend, Ind., assignor, by mesne assignments, to Ford Motor Company, Dearborn, Mich., a corporation of Delaware Application October 9, 1952, Serial No. 313,973

9 Claims. (Cl. 172—219)

The present invention relates to a two-way plow having a reversible moldboard and more particularly to a moldboard plow having a pivotable moldboard and share for directing a furrow slice in either lateral direction upon reversing the angularity of the plow bottom relative to the plow line of draft.

The conventional so-called hillside or two-way plow involves the use of separate, alternately useable moldboard and share structures so that the plow may be made to direct a furrow slice in either lateral direction depending upon which moldboard is in use at a given time. Although such plows are particularly useful in hillside or contour plowing, and also in irrigated areas or elsewhere where it is desirable to eliminate dead furrows, the use of such plows has been limited by the expense of the two mirror image moldboards and the complicated indexing structure.

The plow of the present invention utilizes a single moldboard which is useable to direct a furrow slice in either direction by merely pivoting the plow about a generally vertical axis. The plow moldboard is generally trapezoidal in shape, being outwardly flared at its upper portions to give an increased turning surface for the furrow slice. A single share extends completely across the lower edge of the moldboard, and each lateral extremity of this share defines a sharpened share point. A pair of rearwardly converging landsides are provided rearwardly of the single moldboard with the inboard end one of the landsides being aligned with the plow line of draft in either operating position of the moldboard, while the other landside is disposed transversely of the moldboard and rearwardly thereof out of the way of the furrow slice as it travels over the moldboard. The landsides are inclined upwardly and outwardly with respect to a vertical draft plan of the plow to provide a "sloping landside" and the furrow slice having a cross section substantially in the shape of an oblique angle parallelogram rather than rectangular. This sloping landside gives increased clearance for the outwardly flared lateral edges of the moldboard, thus accommodating a greater inversion of the furrow slice as the same contacts the moldboard.

The moldboard is carried by a plow beam extending upwardly for pivoted connection to the plow frame about an upwardly and forwardly inclined pivot axis to obtain several advantages including raising of the inactive landside, lowering of the active share point, compensation for the tilt of the plow caused by the entry of the tractor wheels into the previously formed furrow, and lateral shifting of the moldboard and share into proper relation with the previously formed furrow. In addition to these advantages, the opposing share points are alternately useable, so that share life is increased and the share point is actually honed by virtue of its alternate use and inactivation, so that the share does not become dull in use.

It is, therefore, an important object of the present invention to provide an improved two-way plow having a reversible moldboard pivotally connected to a plow frame.

Another important object is the provision of a plow in which a reversible moldboard of generally trapezoidal shape is utilized, the plow having sloping landside surfaces accommodating the lateral extension of the moldboard without interfering with plow penetration into the ground.

It is a further object to provide a two-way plow having a pivotally disposed moldboard carried by a beam movable relative to a plow frame about an inclined pivot axis, so that the plow is adapted for use with a tractor or similar prime mover.

Yet another important object is the provision of a plow having a bottom pivotally disposed for arcuate movement in a substantially lateral plane about a forwardly and upwardly inclined pivot axis interposed between the plow bottom and the plow frame, movement of the bottom being effective to tilt the bottom with respect to a horizontal plane to better adapt the plow for use with a tractor or the like.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a plow of the present invention adapted for use with a tractor indicated generally in dotted outline;

Figure 2 is a rear elevational view of the plow of Figure 1 illustrating the same in operating position;

Figure 3 is a plan elevational view of the plow in Figure 1 illustrating the plow in dotted outline in its operating position;

Figure 4 is a bottom view similar to the plan view of Figure 3 further illustrating the plow in one of its operating positions;

Figure 5 is an enlarged sectional view taken along the plane 5—5 of Figure 1;

Figure 6 is an enlarged sectional view taken along the plane 6—6 of Figure 1;

Figure 7 is an enlarged fragmentary view illustrating the plow in one of its operating positions; and Figure 8 is an enlarged fragmentary view similar to Figure 7 illustrating the plow in the other of its operating positions.

As shown on the drawings:

In Figure 1, reference numeral 10 refers generally to a tractor only partially shown in phantom and having a rear axle housing 11 carrying a pair of centrally mounted rock arms 12 actuatable by a tractor-powered hydraulic actuating mechanism and connected through lift links 13 to a pair of laterally spaced trailing draft links 14. The axle housing 13 also carries an upper centrally disposed reaction clevis 15 pivotally connected to a telescopic top link 16 of variable length.

A plow 17 of the present invention is disposed upon the draft links 14 by means of a cross shaft 18 having terminal laterally projecting pins 19 to which the trailing ends of the lower links 14 are attached. The cross shaft 18 is carried by a plow frame comprising a pair of laterally spaced longitudinally extending frame members 20, best illustrated in Figures 1 and 3, and carrying a pair of upwardly convergent plates 21 defining an implement A-frame attachable, as by pivot bolt 22, to the tractor top link 16. The frame elements 20 are joined at their forward ends by a generally U-shaped bracket 23 carrying a depending coulter standard 24 journaling a disc coulter blade 25 at the lower end thereof. The coulter disc 25 is located substantially centrally between the frame elements 20.

The frame elements 20 are also joined adjacent their rear ends by a laterally extending reinforcing rod 26 secured thereto by suitabe means, as by a through bolt 27. Additional shorter bolts 28 serve to attach a U-shaped beam bracket 30 to the inner surfaces of the frame elements 20, as best illustrated in Figure 4. A laterally extending plate 31 is welded or otherwise rigidly secured to the bight portion of the bracket 30 to project forwardly thereof, and a second plate 32 having a depending arcuate flange 33 is bolted to the upper portion of the bight of the bracket 30 by suitable means, such as bolts 34. The plates 31 and 32 are provided with registering apertures 35 (Figure 5) receiving therethrough a pivot pin indicated generally at 36. The pivot pin 36 is provided with a central portion of generally rectangular cross-sectional configuration and with opposing terminal ends 38 of reduced cylindrical configuration insertable through the registering apertures 35 formed in the plates 31 and 32, respectively. The rectangular central portion 37 of the pin 36 is traversed by a plurality of attachment bolts serving to secure to opposing sides of the posts a pair of joining plates 40 extending generally longitudinally within the confines of the bracket 30 for connecton, as through bolts 41, of the plates to a generally vertically disposed beam 42. It will be noted that the pivot pin 36 and the upper end of the beam 41 do not lie in an exactly vertical plane, but rather are inclined upwardly and forwardly. It has been found that an inclination on the order of 10° from vertical is desirable for reasons to be hereinafter more fully described.

The beam 42 extends downwardly to underlie the plow frame and the downwardly and forwardly projecting free lower end of the beam is secured, as by bolts 43, to a pair of mirror image frog plates 44, secured as by bolts 45 to the rear surface of a generally trapezoidal moldboard 46. The connection of the beam 42 to the plates 44 is accomplished through bolts 47 (Figure 7) traversing the beam lower end and extending through rearwardly projecting inner terminal flanges 44a of the frogs.

The moldboard 46 is best illustrated in Figures 1, 4, and 7. The moldboard is provided with a front furrow-contacting face 48 of generally arcuate contour, the upper and lower edges 49 and 50, respectively, of the moldboard are parallel and are substantially horizontal when the moldboard is centrally disposed, as illustrated in Figures 1 and 3. The lateral opposing edges of the moldboard are generally upwardly and outwardly flared to increase the moldboard breadth adjacent the upper edges thereof, the moldboard being thus provided with generally arcuate laterally extending projections 51 at each upper corner thereof.

The moldboard carries a strip-type share 52 extending along the lower edge 50 thereof, the share having lower lateral corners 53 defining sharpened share points and a substantially straight lower edge 54 defining the share cutting edge. The outer lateral edge of each of the frogs 44 terminates short of the adjacent lateral edge of the moldboard (Figure 7) in a rearwardly extending terminal flange 44b secured, as by bolts 44c, to one of a pair of rearwardly convergent landsides 55 having forward ends lying in juxtaposition to the rear surface of the moldboard. The landside edges are rearwardly convergent and the convergent rear portions thereof are secured together by an angular brace 55a bolted to the landsides. As best illustrated in Figures 1 and 2, the landsides 55 are upwardly and outwardly inclined and smoothly and matingly conform to the corresponding edge of the moldboard. The inclined landsides, in combination with the adjacent outwardly flared moldboard edge, result in the cutting of a furrow slice having a cross section substantially in the form of an oblique angle parallelogram rather than in the form of a rectangle. Although the moldboard carries the lateral extensions 51, each extension is actually aligned with the corresponding sloping landside when the extension forms the leading moldboard edge, as best seen in Figure 7. Therefore, the moldboard extensions 51 do not hinder moldboard penetration, the use of sloping landsides permit such moldboard extension to form the parallelogram furrow slice, and an additional furrow-inverting moldboard surface is provided.

The moldboard, as best illustrated in Figure 3, is pivotable about the pin 36 to a pair of laterally adjusted positions, as indicated in dotted outline. To assist the moldboard in assuming these positions, there is provided a moldboard shifting mechanism, including an upwardly and laterally projecting pivot arm 56 joined to the pivot pin 36 by means of a pair of bolts 57 joining the arm to the beam 42 to project thereabove. The pivot arm 56 is provided with a terminal lateral extending flange 58 to which is connected an actuating rod 59 projecting forwardly toward the tractor 10. The free forward end of the rod 59 is joined to a medial portion of a hand lever 60 pivotally connected at its lower end by pivot bolt 61 to a positioning plate 62. The pivot bolt 61 (Figure 6) is elongated to project through and beyond registering apertures in the lever 60 and the plate 62. The plate 62 is secured through a spacer element 64 and a plurality of attachment bolts 65 to one of the A-frame plates 21.

A thumb screw 65 is threadedly received, as at 66, by the lever 60 and a lateral extension thereon to project through the lever for selective contact with the plate 62, and an abutment pin 67 is also carried by the lever 60 for contact with the opposing fore and aft edges 68 of the plate 62. If the thumb screw 65 is threaded into the arm 62 to project therebeyond, it prevents contact of the pin 67 with the edges 68 of the plate. On the other hand, if the thumb screw is retracted and the lever 60 is moved longitudinally about its pivot bolt 61, the pin will contact the edges of the plate and will serve to retain the moldboard in a selected one of its two illustrated positions. The spring 63 urges the lever 60 into contact with the plate 62, while at the same time accommodating sufficient relative movement therebetween to move the pin 67 laterally for adjusting the lever upon the plate.

*Operation*

The operation of the plow of the present invention will be readily understood from a study of the drawings and from the detailed description heretofore given. The plow, when in transport position, is usually retained in its straight ahead position, as illustrated in Figure 3. In order to render the plow operable, the plow is lowered through draft links 14 to an operating position, as shown in Figure 2, and the bottom is shifted laterally to a selected one of its two operating positions.

If the thumb screw 65 is in its innermost threaded position in contact with the plate 62, the pin 67 does not contact the plate or the plate marginal edges and the plow bottom is free to swing laterally. Upon dropping of the furrowside tractor wheel into the furrow, as illustrated in Figures 2, 7 and 8, the plow will be swung toward that side upon which the wheel is lowered, inasmuch as the bottom is free to pivot about the pivot pin 36 and the weight of the plow tends to find its lowermost point. To be operable, it is not necessary that the bottom swing completely to its adjusted position since any tendency of the plow to swing in that direction will cause the plow to assume its fully adjusted position due to the resistance of the ground.

On the other hand, if desired or necessary, the plow bottom may be swung to its adjusted position and retained in that position by utilizing the hand lever 60 which is in a position to be readily grasped by the tractor operator. To retain the swinging of the plow bottom under operator control, the thumb screw 65 is retracted, so that the pin 67 will engage the marginal edges of the plate 62, and shifting of the bottom is accomplished by pushing the lever 60 laterally against the force of the spring 63 and then rocking the lever 60 forwardly or rearwardly so that the pin may drop alongside the desired plate marginal edge under the influence of the spring 63.

From Figure 4 of the drawings, it will be appreciated that only one of the angularly disposed sloping landsides 55 is utilized at any given time and that the landsides are alternately useable, with the inactive landslide extending transversely to the path of travel of the plow behind the moldboard and share so as to prevent interference with the plowing action.

Further, the advantages of the inclined pivot pin 36 will be readily appreciated by an inspection of Figures 2 and 7 of the drawings. Through the use of this pivot pin, the active share point is lowered into proper relationship with the ground to obtain proper plowing suction, the inactive landside is elevated to prevent wearing of the same, the bottom is tilted so as to compensate for the dropping of one of the tractor wheels into the previously formed furrow, and the moldboard is laterally shifted so that that edge of the moldboard toward the plowed ground is located rearwardly of the share cutting point and the trailing moldboard extension 51 is effective to fully invert the furrow slice. Further, as will be seen in Figure 5, the plates 40 joining the plow beam to the pivot pin are positioned so as to contact the inner surface of the beam bracket 30 to provide a stop preventing further lateral shifting of the bottom beyond that position illustrated in Figure 4.

Thus, it will be evident to those skilled in the art that the present invention provides a new and novel type of moldboard plow having a reversible plow bottom for directing a furrow slice in either lateral direction by the use of a single moldboard and share which are jointly laterally shiftable to a selected angular position relative to the plow line of draft.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A two-way plow comprising a plow frame, means defining a substantially vertically disposed pivot axis on said frame, a plow beam oscillatable about said axis, a pair of mirror image frogs having a central upstanding portion and laterally spaced rearwardly extending inner and outer terminal flanges, means securing said beam intermediate corresponding adjacent inner terminal flanges of said frogs, a vertically arched, forwardly concave moldboard mounted on said frogs, rearwardly extending landsides abutting the rear surface of said moldboard in flatwise contact with the outer flanges, respectively, of said frogs, means securing said landsides to said outer frog flanges, an actuating lever pivotally carried by said frame, linkage means joining said lever to said beam for oscillating the same upon pivoted movement of said lever, and an indexing plate engaged by said lever at each extremity of pivoted movement thereof to retain said lever in position with said beam and moldboard in one of a pair of adjusted plowing positions.

2. A two-way plow comprising a plow frame, a pivot pin on said frame defining a generally vertical pivot axis, a depending plow beam pivotal laterally about said axis, a vertically arched, forwardly concave moldboard carried by said beam for pivoting movement therewith and having lateral extremities provided with upper outwardly flared portions defining a laterally directed integral moldboard extension at each upper corner thereof, a share extending along the lower edge of said moldboard and having a sharpened point at either end thereof, rearwardly convergent landsides having their forward ends abutting the rear surface of said moldboard in longitudinal alignment with the share edges, and means securing the rearward extremities of said landsides to one another to cooperatively define a rigid triangular landside-moldboard structure, said landsides having upwardly and outwardly directed exterior furrow-wall contacting surfaces lying respectively in substantially the same plane as the edges of said moldboard lateral extremities to define a sloping furrow wall effective to form a furrow slice having a cross section substantially in the form of an oblique angle parallelogram.

3. A two-way plow comprising a plow frame, means defining a substantially vertically disposed pivot axis on said frame, a plow beam oscillatable about said axis, a pair of mirror image frogs each having a central upstanding portion and rearwardly extending inner and outer terminal flanges at each lateral side of said central portion, means securing said beam intermediate corresponding adjacent inner terminal flanges of said frogs, a vertically arched, forwardly concave moldboard mounted on said frogs, rearwardly convergent landsides having forward ends abutting the rear surface of said moldboard and inner forward surfaces in flatwise contact with the outer flanges, respectively, of said frogs, means securing the forward portions of said landsides to said outer frog flanges, and means securing the convergent rear ends of said landsides to one another.

4. A two-way plow comprising a plow frame, means defining a substantially vertically disposed pivot axis on said frame, a plow beam oscillatable about said axis, a pair of mirror image frogs each having a central upstanding portion and rearwardly extending inner and outer terminal flanges at each lateral side of said central portion, means securing said beam intermediate corresponding adjacent inner terminal flanges of said frogs, a vertically arched, forwardly concave moldboard mounted on said frogs, rearwardly extending landsides abutting the rear surface of said moldboard in flatwise contact with the outer flanges, respectively, of said frogs, and means securing said landsides to said outer frog flanges.

5. In a two-way plow having a plow frame, a reversible moldboard pivotally carried by said frame, and a share having opposing points alternately useable upon reversing of the moldboard, the improvements which comprise a pair of rearwardly convergent landsides respectively having forward ends abutting the rear faces of said moldboard and said share in alignment with the lateral edge of said points, the rear ends of said landsides projecting rearwardly into juxtaposition, frog means securing said landside forward ends to said moldboard, and bracket means joining the juxtapositioned landside rear ends, said landsides having upwardly and outwardly sloping furrow wall-contacting surfaces, and laterally projecting furrow turning extensions formed on each end of said moldboard, the forward edge of each of said extensions lying in the same plane as the furrow wall contacting surface of the adjacent sloping landside, thereby providing increased furrow turning surface without interference with plow penetration.

6. A two-way plow comprising a plow frame, means on said frame defining a generally vertical pivot axis, a depending plow beam pivotal laterally about said axis, a trapezoidal moldboard carried by said beam for pivoting movement therewith and having sloping lateral extremities defining a laterally directed integral moldboard extension at each upper corner thereof, a share fixed to and extending along the lower edge of said moldboard, and rearwardly extending landsides abutting the rear surface of said moldboard in longitudinal alignment with the share edges, said landsides having upwardly and outwardly directed exterior furrow-wall contacting surfaces lying in substantially the same plane as moldboard lateral extremities to define a sloping furrow wall effective to form a furrow slice having a cross section substantially in the form of an oblique angle parallelogram rather than a rectangle.

7. A two-way plow comprising a plow frame, means defining a substantially vertically disposed pivot axis on said frame, a plow beam oscillatable about said axis, a pair of mirror image frogs each having a central upstanding portion and rearwardly extending inner and outer terminal flanges at each lateral side of said central portion, means securing said beam intermediate corresponding adjacent inner terminal flanges of said frogs, a vertically arched, forwardly concave moldboard having its rear surface in face-to-face relation with said central portions of said frogs, said moldboard also having upwardly and outwardly flared upper portions defining laterally extending furrow-inverting moldboard wings, means securing said moldboard to said frogs, rearwardly extending landsides abutting the rear surface of said moldboard in flatwise contact with the outer flanges, respectively, of said frogs, said landsides being upwardly and outwardly sloping in substantial alignment with said moldboard wings, and means securing said landsides to said outer frog flanges.

8. A two-way plow comprising a plow frame, means defining a substantially vertically disposed pivot axis on said frame, a plow beam oscillatable about said axis, a vertically arched, forwardly concave moldboard supported from the lower end of the plow beam for oscillation in either direction from a transversely extending position, a plow share extending in edge-to-edge relation along the lower edge of the moldboard, and a landside extending rearwardly at an acute angle from each end of the moldboard, the landsides converging midway of the length of and behind the moldboard and the outer faces of the landsides being flush with the end edges of the moldboard and share.

9. A two-way plow as claimed in claim 8, in which the landsides are upwardly outwardly inclined.

References Cited in the file of this patent

UNITED STATES PATENTS

| | | |
|---|---|---|
| 375,802 | Clark | Jan. 3, 1888 |
| 698,081 | Turner | Apr. 22, 1902 |
| 778,838 | Belk | Jan. 3, 1905 |
| 785,474 | Burkhart | Mar. 21, 1905 |
| 1,528,863 | Walker | Mar. 10, 1925 |
| 2,002,751 | Nordstrom | May 28, 1935 |
| 2,218,885 | Kennedy | Oct. 22, 1940 |
| 2,416,207 | Olson | Feb. 18, 1947 |
| 2,417,595 | Heath | Mar. 18, 1947 |
| 2,453,197 | Clay | Nov. 9, 1948 |
| 2,560,711 | Arps | July 17, 1951 |
| 2,622,502 | Altgelt | Dec. 23, 1952 |

FOREIGN PATENTS

| | | |
|---|---|---|
| 168,779 | Austria | Aug. 10, 1951 |
| 281,661 | Switzerland | July 1, 1952 |